April 19, 1960 W. R. TUCKER 2,933,285
PACKING ARRANGEMENT FOR VALVES OR THE LIKE
Filed May 10, 1956 2 Sheets-Sheet 1

Inventor
WARREN R. TUCKER
by: Ooms, McDougall, Williams & Hersh
Attorneys

April 19, 1960　　　W. R. TUCKER　　　2,933,285
PACKING ARRANGEMENT FOR VALVES OR THE LIKE
Filed May 10, 1956　　　　　　　　　　　　2 Sheets-Sheet 2
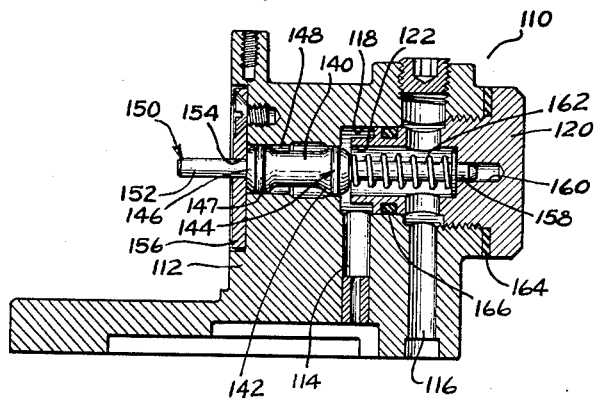
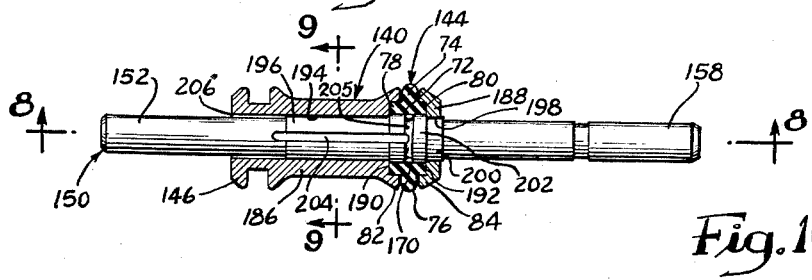
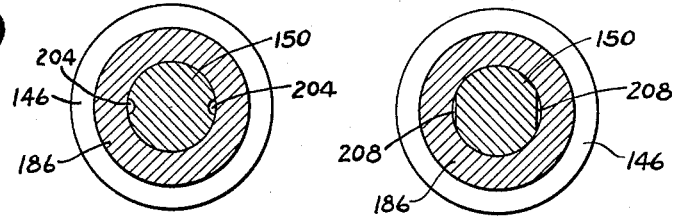
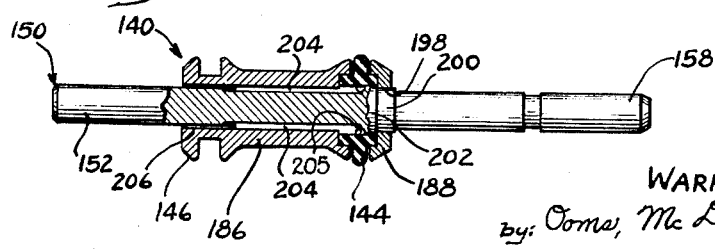
Inventor
WARREN R. TUCKER
by: Ooms, McDougall, Williams
　　　　& Hersh
　　　　　Attorneys United States Patent Office 2,933,285
Patented Apr. 19, 1960

2,933,285
PACKING ARRANGEMENT FOR VALVES OR THE LIKE

Warren R. Tucker, Barrington, Ill., assignor to Parker-Hannifin Corporation, a corporation of Ohio Application May 10, 1956, Serial No. 584,109

1 Claim. (Cl. 251—324)

This invention relates to valves or similar devices and pertains particularly to packing or sealing arrangements adapted to prevent leakage of fluid between movable valve parts.

One principal object of the present invention is to provide a new and improved packing arrangement in which the packing is securely retained on the valve member.

A further object is to provide a new and improved packing arrangement which prevents the packing or sealing ring or other member from being blown or ballooned from its normal position by fluid pressure.

Another object is to provide a new and improved packing arrangement in which the packing is vented so that fluid pressure holds the packing in place rather than tending to blow the packing out of place.

It is another object to provide a packing arrangement in which the packing is extremely long-lived.

Another object is to provide a new and improved packing arrangement having components which are easily and economically made and assembled.

Further objects and advantages of the present invention will appear from the following description, taken with the accompanying drawings, in which:

Fig. 6 is a longitudinal sectional view taken through a different valve embodying a modified packing arrangement constructed in accordance with the invention.

Fig. 7 is a longitudinal sectional view taken through the valve spool of the valve of Fig. 6.

Fig. 8 is a longitudinal view of the spool, partly in section along a line 8—8 in Fig. 7.

Fig. 9 is an enlarged cross sectional view taken along a line 9—9 in Fig. 7.

Fig. 10 is a view similar to Fig. 9 but showing a slightly modified construction.

Figure 1:
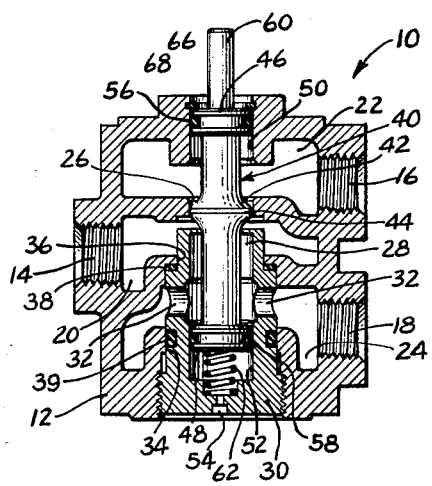
Fig. 1 is a longitudinal sectional view of a valve having a packing arrangement which constitutes an illustrative embodiment of the invention.
Figure 3:
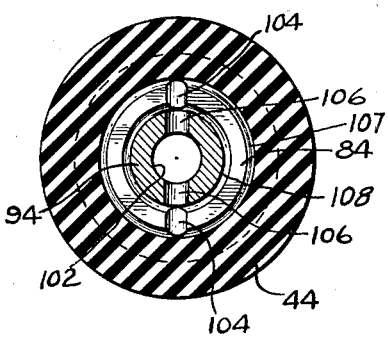
Fig. 3 is an enlarged cross sectional view through the valve spool, taken generally along a line 3—3 in Fig. 2.

As already indicated, Fig. 1 illustrates a valve 10 which embodies a packing arrangement constructed in accordance with the invention. It should be understood that the present invention is applicable to a wide variety of valves or other devices. Thus, the construction of the valve 10 is disclosed purely by way of illustration and should not be taken as any limitation upon the scope of the invention.

As shown, the valve 10 comprises a body 12 having fluid carrying openings 14, 16 and 18. While the valve may be connected in various ways, the opening 14 may be considered to be an inlet opening, adapted to receive fluid under pressure. The openings 16 and 18 may be considered as first and second outlet openings, adapted to be connected alternatively to the inlet opening 14, according to the position of the valve.

In this instance, the openings 14, 16 and 18 connect with corresponding chambers 20, 22 and 24 in the valve body 12. A first port 26 extends in the body between the inlet chamber 20 and the first outlet chamber 22, while a second port 28 extends between the inlet chamber and the second outlet chamber 24. It will be seen that the first port 26 happens to be formed directly in the body 12, while the second port 28 is formed in a plug 30 which is threaded into the body or otherwise removably mounted therein. The port 28 is in the form of an axial bore in the plug 30. Radial openings 32 extend in the plug between the port 28 and the outlet chamber 24. The plug 30 extends through aligned bores 34 and 36 in the body 12. The bore 34 extends between the outside of the body and the outlet chamber 24, while the bore 36 extends between the outlet chamber 24 and the inlet chamber 20. It will be seen that a gasket 38 is interposed between the plug 30 and the body 12 to prevent leakage of fluid through the bore 36. A sealing ring 39 is interposed between the plug 30 and the bore 34 to prevent leakage of fluid therebetween.

Communication through the ports 26 and 28 is controlled by a movable valve member, illustrated as a valve spool 40 of generally cylindrical shape. As shown, the spool 40 has an enlarged portion 42 adapted to move alternatively into the ports 26 and 28 so as to close them off. When one port is closed, the other is open. A packing or sealing ring 44 is carried by the enlarged portion 42, as will be described in greater detail shortly. It will be seen that the sealing ring 44 is movable between the ports 26 and 28 and is adapted to seal each of them in turn.

In the illustrated valve 10, the valve spool 40 extends in both directions from the enlarged central portion 42. Thus, the valve spool extends through both ports 26 and 28. At its opposite ends, the illustrated spool 40 has enlarged end portions 46 and 48 which are slidably guided in bores 50 and 52. The bore 50 happens to be formed directly in the body, and is arranged to extend from the outside of the body into the outlet chamber 22. The bore 52 is formed in the plug 30. An axial vent opening 54 extends in the plug 30 between the outside of the valve and the bore 52. It will be seen that sealing rings 56 and 58 are disposed between the enlarged end portions 46 and 48 and the respective bores 50 and 52, to prevent leakage of fluid therethrough.

In the illustrated valve 10, an operating shaft or pin 60 extends outside of the body 12 from the spool 40 through the bore 50. The valve is operated by pushing the shaft 60 inwardly against the resilient biasing action of a spring 62, interposed between the plug 30 and the spool 40. It will be seen that the spring 62 is disposed in the bore 52. The spring 62 biases the valve spool 40 toward a position in which the enlarged valve member 42 closes off the port 26. Pushing the shaft 60 inwardly moves the enlarged valve member 42 into the port 28. When the shaft 60 is released, the spring 62 returns the spool 40 in an outward direction. Outward movement of the spool is limited by a suitable stop, which happens to take the form of a split ring 66 expanded into an internal groove 68 which is formed in the bore 50. The enlarged end portion 46 is engageable with the ring 66. It will be understood that the shaft 60 may be operated manually or by any suitable operating device, such as a solenoid, for example.

Figure 2:
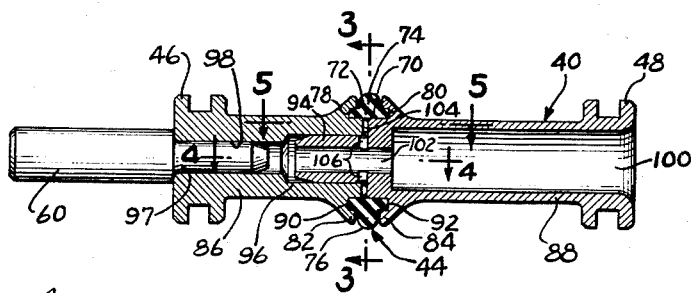
Fig. 2 is a longitudinal sectional view showing the illustrative packing arrangement, as employed on the valve spool of the valve of Fig. 1.
Figure 4:
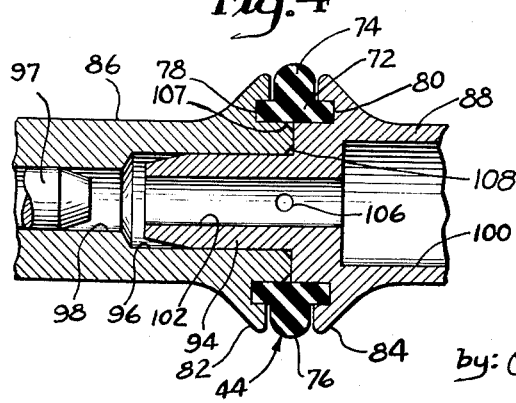
Fig. 4 is a fragmentary enlarged longitudinal sectional view taken generally along the line 4—4 in Fig. 2.

From Fig. 2, it will be apparent that the sealing ring 44 is seated in a groove 70 which is formed in the valve spool 40. It is preferred that both the sealing ring 44 and the groove 70 be T-shaped in cross section, as illustrated. However, some of the features of the invention can be utilized with rings of other shapes, as will be discussed in greater detail shortly. The sealing or packing ring 44 may be made of natural or synthetic rubber, or any other suitable soft resilient material.

As shown, the T-shaped sealing ring 44 has a relatively wide base or inner portion 72. A narrower central tongue portion 74 extends outwardly from the base portion 72. It will be apparent that the annular tongue portion 74 has a rounded outer extremity 76 which is adapted to seal the ports 26 and 28 in the valve 10. As illustrated, the curvature of the outer extremity 76 is substantially circular.

The wide base 72 of the sealing ring 44 defines laterally projecting flanges 78 and 80 thereon which are retained in the T-shaped groove 70 by overhanging annular lips 82 and 84. It will be apparent that the lips 82 and 84 project toward each other in opposed relation. Slight clearance is preferably provided between the lips 82 and 84 and the sides of the tongue portion 74 on the sealing ring 44. This clearance provides room for slight flexing movement and compression of the tongue 74 when it is moved into the ports 26 and 28. The clearance may amount to a few thousandths of an inch.

In order that the T-shaped sealing ring 44 may readily be mounted on the spool 40, it is preferred to form the spool in two parts 86 and 88 which are joined end-to-end at the groove 70. Thus, complementary portions 90 and 92 of the T-shaped groove 70 are formed on the parts 86 and 88. In this instance, substantially one half of the groove 70 is formed on each part 86 and 88 of the spool 40. Thus, the lip 82 is on the part 86, while the lip 84 is on the part 88. With this two-part arrangement, it is a simple matter to assemble the spool 40 with the sealing ring 44 mounted in the groove 70.

The parts 86 and 88 of the spool 40 may be rigidly joined in a variety of ways. In this instance, the part 88 has an axial stem 94 which is press-fitted into an axial bore 96 formed in the part 86. In this instance, the shaft 60 is also formed as a separate part, having a stem 97 which is press-fitted into a bore 98 formed in the part 86. It will be understood that the parts 86 and 88 of the spool might be joined by screwed threads or in any other suitable way.

Figure 5:
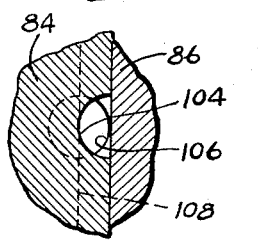
Fig. 5 is a greatly enlarged fragmentary sectional view, taken along a line 5—5 in Fig. 2.

Provision is made for venting the underside of the sealing ring 44 so as to obviate any tendency for the fluid pressure to blow the ring out of the groove 70. The venting is accomplished by providing a vent passage between the groove and the outside atmosphere, or some other region of low pressure. The vent passage may assume a variety of forms. In this instances, one of the parts of the spool, more specifically, the part 88, has an axial bore 100 which communicates with the atmosphere through the bores 52 and 54 in the plug 30. A reduced axial bore 102 extends into the stem 94 from the bore 100. Communication is afforded between the bore 102 and the bottom of the groove 70 through passages 104 and 106 in the parts 86 and 88. In this instance, the passages 104 take the form of notches formed in the end of the part 86, as will be apparent from Fig. 5. The passages 106 are formed as radial holes extending between the outside of the stem 94 and the bore 102. In order that the sealing ring 44 may be vented all the way around its underside, a shallow annular groove 107 is formed in the bottom of the T-shaped ring groove 70 and is arranged to connect with the vent passages 104. In this case, the vent groove 107 is defined by chamfers 107a and 107b on the parts 86 and 88. An additional annular groove 108 is formed between the ports 86 and 88 to insure that the passages 104 and 106 will be interconnected, regardless of how the parts 86 are oriented during assembly. As shown, the groove 108 takes the form of a chamfer on the part 86.

With the venting arrangement, the underside of the sealing ring 44 is maintained at a low pressure at all times. It is impossible for fluid pressure to build up under the sealing ring. Thus, the venting arrangement prevents the ring from being blown out of its seat on the valve spool. With the venting arrangement, the fluid pressure actually presses the ring forcibly into its retaining groove so that there is never any tendency for the ring to balloon outwardly.

The exact details of the venting arrangement may be varied to suit the particular type of valve in which the venting arrangement is embodied. To illustrate this point, a somewhat different valve 110 is shown in Fig. 6. In this case, the valve 110 has a body 112 formed with openings 114 and 116 whichh extend from the outside of the body 112 into a bore 118. A plug 120 is mounted in the bore 118 to define a port 122 which affords communication between the openings 114 and 116. The port 122 is adapted to be closed and opened by an enlarged valve member 142 formed on a valve spool 140. It will be seen that a packing ring 144 is mounted in the enlarged valve member 142 to seal off the port 122. It will be seen from Figs. 7 and 8 that the sealing ring 144 is essentially the same in construction as the sealing ring 44 of the embodiment shown in Figs. 1–5.

In the illustrated valve 110, the valve spool 140 has an enlarged end portion 146 which is slidably guided in a bore 148, constituting a reduced extension of the bore 118. A sealing ring 147 is mounted on the enlarged portion 146 to prevent leakage of fluid between the enlarged portion 146 and the bore 148. The valve spool 140 is also guided by a shaft 150 which extends through the spool. One end portion 152 of the shaft 150 extends outside of the body 112 beyond the enlarged end portion 144. The shaft portion 152 extends through an aperture 154 in a retaining plate 156 which is engageable by the enlarged portion 146 to limit outward movement of the spool 140.

At its opposite end, the shaft 150 has a portion 158 which is slidably guided in a bore 160 formed in the plug 120. To bias the valve member 142 away from the port 122, a spring 162 is disposed between the valve member 142 and the plug 120. Leakage around the plug 120 is prevented by a gasket 164 and a sealing ring 166.

As already indicated, the sealing ring 144 may be essentially the same as the sealing ring 44. Moreover, the spool 140 may be formed with a T-shaped groove 170 of substantially the same shape as the groove 70 in the first embodiment. Here again, the spool 140 is formed in two parts 186 and 188 which define complementary portions 190 and 192 of the groove 170. It will be seen that the two parts 186 and 188 of the spool 140 are both press-fitted or otherwise suitably mounted on the shaft 150. Thus, the part 186 has an axial bore 194 which is press-fitted onto a central portion 196 of the shaft 150. It will be seen that the part 188 of the spool 140 is in the form of a ring or collar having an axial bore 198 which is press-fitted onto another portion 200 of the shaft 150. As shown, the shaft 150 has a slightly enlarged portion 202 which is formed between the portions 196 and 200. The portion 202 forms the bottom of the groove 170. Thus, the sealing ring 144 is received around the portion 202 of the shaft 150. The parts 186 and 188 of the spool 140 are seated against opposite sides of the enlarged portion 202 on the shaft.

In the embodiment of Figs. 6–9, the body portion 72, tongue portion 74, rounded outer edge 76, and the flanges 78 and 80 on the sealing ring are the same in the embodiment of Figs. 1–5 and have been given the same characters. The same is true of the annular lips 82 and 84 on the valve spool.

As in the embodiment of Figs. 1–5, the underside of the sealing ring 144 is vented so that fluid pressure will tend to hold the ring in place rather than having any tendency to blow the ring out of the groove 170. Thus, one or more vent passages 204 are formed in the valve spool 140. However, in Figs. 6–9, the manner of venting is somewhat different than in Figs. 1–5. As shown, the vent passages 204 take the form of longitudinal grooves formed in the outside of the shaft 150. In this instance, each of the grooves 204 extends along the end portion 152, the central portion 196 and the enlarged portion 202 of the shaft 150. Two of the grooves 204 are provided in the illustrated construction, although one would be sufficient in some cases. Moreover, more than two grooves might be provided. The illustrated grooves 204 are at diametrically opposite points on the shaft 150. A shallow annular groove 205 is formed in the shaft 150 around the bottom of the seal groove 170.

The length of the vent grooves 204 is sufficient to insure that the underside of the sealing ring 144 will be vented to the atmosphere or to some other region of low pressure. In the illustrated valve 110, the portion of the bore 148 on the outside of the sealing ring 147 is in communication with the atmosphere through the normal sliding clearance between the bore 154 and the end portion 152 of the shaft. From Fig. 7 it will be apparent that the end portion 152 is of reduced diameter with respect to the central portion 196 of the shaft 150. The end portion 152 extends part way into the bore 194 in the spool 140 and thereby defines an annular passage 206 between the end portion 152 and the bore 194. The grooves 204 extend along the shaft 150 between the annular passage 206 and the groove 205 extending around the underside of the sealing ring 144. Thus, the underside of the ring 144 is in communication with the atmosphere.

Fig. 10 shows a slightly modified construction in which the grooves 204 are replaced by flats 208 on the shaft 150. Otherwise, the construction shown in Fig. 10 may be the same as that shown in Figs. 6–9.

In all of the illustrated embodiments of the invention, the rounded outer extremity 76 of the sealing or packing ring forms a perfect seal with the port or ports into which the sealing ring is movable. The soft resilient sealing ring conforms to any minor variations in the ports and thereby assures a perfect seal.

The mechanical retention of the sealing ring on the valve spool is extremely secure because of the T-shaped cross section of the sealing ring and the corresponding cross section of the groove in the valve spool. Nevertheless, it is a simple matter to mount the sealing ring on the valve spool because of the multiple-part construction thereof. In each case, the parts of the spool are split along the T-shaped groove so that the T-shaped ring may be mounted on the spool before the parts are fully assembled. The assembly may then be completed, simply by pressing the parts into fully engaged positions. In each case, interengaging shoulders are provided on the parts of the spool so that the assembled relation of the parts is fully predetermined. This insures that the sealing ring will be seated correctly between the parts and will be securely retained by the annular lips 82 and 84.

Although the mechanical retention of the sealing ring is very secure, there may be some chance for working fluid to get under the sealing ring. This is particularly true where the sealing ring travels between ports and thus is subject to mechanical deflection when the ring engages the ports. However, the venting of the ring eliminates any possibility that the working fluid may blow the sealing ring out of its groove or even balloon the ring beyond its normal position. Any working fluid that might get under the sealing ring is immediately vented to the atmosphere through the vent passages in the valve spool. However, the vent passages largely eliminate any chance for working fluid to get under the ring. Because of the venting arrangement, the full fluid pressure compresses the sealing ring against the bottom of the groove in the valve spool. Thus, the ring is firmly held in its proper position. Accordingly, substantially no opportunity is afforded for working fluid to get under the ring.

It will be understood that the construction of the vent passage or passages may be varied to suit the particular type of valve to which the invention may be applied. Moreover, the venting arrangement of the present invention may be employed with various shapes and types of sealing rings.

Various other modifications, alternative constructions and equivalents may be employed without departing from the true spirit and scope of the invention as exemplified in the foregoing description and defined in the following claim.

I claim:

In a valve, the combination comprising a body having a fluid carrying port therein, a valve spool movable in said body for opening and closing said port, said valve spool having a plurality of rigidly connected parts with joints therebetween, interchangeable means on said parts joining said parts in coaxial relation, said spool having an external groove of T-shaped cross section therein, complementary annular portions of said groove being formed in two of said parts, said groove having a relatively narrow outer portion and a wider inner portion, said last mentioned two parts having opposed annular lips defining said narrow outer portion of said groove, each of said lips being integral with the corresponding part, a soft resilient sealing ring of T-shaped cross section received in said groove, said ring having a pair of laterally projecting base flanges and a central tongue projecting outwardly therefrom through said narrow outer portion of said groove, said lips being effective to interlock with said base flanges to retain said ring in said groove, said base flanges fitting snugly in said groove and under said lips for secure retention in said groove, said tongue extending between said lips with appreciable clearance between said tongue and each of said lips to provide for slight flexing movement of said tongue between said lips, said tongue of said ring having a rounded outer annular portion for entering and sealing said port, said valve spool having one end portion in communication with the atmosphere outside said body, one of said parts having an annular vent groove therein extending around the bottom of said T-shaped groove and centered under said sealing ring midway between the ends of said base flanges, and a vent passage extending in said valve spool from said vent groove to a point on said end portion of said spool in communication with the atmosphere for venting the underside of said ring to the atmosphere and thereby preventing said ring from being blown out of said groove, a portion of said vent passage comprising a groove formed in one of said parts and leading from said vent groove along one of the joints between said parts.

References Cited in the file of this patent

UNITED STATES PATENTS

| | | |
|---|---|---|
| 2,044,590 | Neuhaus | June 16, 1936 |
| 2,349,170 | Jackman | May 16, 1944 |
| 2,506,111 | Saint | May 2, 1950 |
| 2,542,390 | Brown | Feb. 20, 1951 |
| 2,666,614 | Grove et al. | Jan. 19, 1954 |
| 2,704,650 | Rand | Mar. 22, 1955 |
| 2,713,989 | Bryant | July 26, 1955 |
| 2,723,681 | MacGlashan | Nov. 15, 1955 |